United States Patent [19]

Krajicek

[11] 4,282,929
[45] Aug. 11, 1981

[54] METHOD OF CONTROLLING SCALE IN OIL RECOVERY OPERATIONS

[75] Inventor: Richard W. Krajicek, Houston, Tex.

[73] Assignee: Carmel Energy, Inc., Houston, Tex.

[21] Appl. No.: 61,673

[22] Filed: Jul. 30, 1979

[51] Int. Cl.³ .................. E21B 43/24; E21B 43/27
[52] U.S. Cl. .................. 166/303; 166/244 C; 166/302; 166/307
[58] Field of Search ............... 166/271, 272, 302, 303, 166/307, 244 C; 252/8.55 E

[56] References Cited

U.S. PATENT DOCUMENTS

| | | | |
|---|---|---|---|
| 2,675,083 | 4/1954 | Bond et al. ............ | 166/307 X |
| 3,163,745 | 12/1964 | Boston .................. | 166/57UX |
| 3,259,187 | 7/1966 | Prats ..................... | 166/271 X |
| 3,384,177 | 5/1968 | Day et al. .............. | 166/307 |
| 3,388,744 | 6/1968 | Fincher et al. ......... | 166/307 X |
| 3,948,323 | 4/1976 | Sperry et al. .......... | 166/303 |
| 3,980,137 | 9/1976 | Gray .................... | 166/303 |
| 3,993,135 | 11/1976 | Sperry et al. .......... | 166/303 |
| 4,103,743 | 8/1978 | Paul ..................... | 166/302 X |
| 4,118,925 | 10/1978 | Sperry et al. .......... | 60/39.05 |

OTHER PUBLICATIONS

Greenwell et al., "Use of Ammonia to Prevent Casing Corrosion", *Corrosion-National Association of Corrosion Engineers*, vol. 11, Nov. 1975.

*Primary Examiner*—James A. Leppink
*Assistant Examiner*—George A. Suchfield
*Attorney, Agent, or Firm*—Pravel, Gambrell, Hewitt, Kirk, Kimball & Dodge

[57] ABSTRACT

Disclosed is a method of producing highly viscous minerals from a subterranean formation by injection of an acidic, thermal vapor stream without substantial scale buildup in downstream piping, pumps and well bore. The process comprises heating the formation by injection of heat, preferably in the form of a thermal vapor stream composed of combustion gases and steam and injecting an acidic compound simultaneously with the thermal vapor stream into the formation at a temperature above the dew point of the thermal vapor stream. The acidic, thermal vapor stream increases the solubility of metal ions in connate water and thus reduces scaling in the downstream equipment during the production of viscous hydrocarbons.

1 Claim, No Drawings

METHOD OF CONTROLLING SCALE IN OIL RECOVERY OPERATIONS

The government of the United States of America has rights in this invention pursuant to Contract No. ET-78-L 03-2046 awarded by the U.S. Energy Research and Development Administration (now the Department of Energy).

TECHNICAL FIELD OF THE INVENTION

The present invention relates to a method of enhancing the production of viscous minerals particularly crude viscous petroleum, from a subterranean formation without significant scaling in the well bore and downstream production piping.

PRIOR ART

Many processes have been developed over the years for increasing the recovery of minerals, particularly hydrocarbons, from underground formations. Some have proved successful, but much more difficulty has been encountered in trying to recover heavy hydrocarbons, particularly viscous petroleum and consequently many thousands of barrels of oil have been heretofore unrecoverable. Most of these methods have involved injecting thermal energy usually in the form of steam, into the petroleum-bearing formations to reduce viscosity of the crude oil by elevating its temperature. As is well known, a reduction in the viscosity of petroleum increases the mobility of petroleum in the formation and the case by which it may be recovered. The decreased viscosity enables it to be withdrawn from the ground in greater quantities. These processes have utilized thermal energy in many different forms, such as, hot water, steam, heated gases, and in-situ combustion. Steam, alone or in combination with other agents, has been the most widely used source of thermal energy because of its relatively low cost and ease of preparation.

There are two basic methods for injecting thermal energy into subterranean formations to increase the recovery of viscous petroleum. One method involves the use of two or more wells, whereby steam is injected into the formation by one well, an injection well, and petroleum is produced through a second, or production well. The injected steam heats the formation, lowers the viscosity of the petroleum and drives the petroleum towards a production well where it is drawn to the surface. This technique is usually referred to as "steam drive" and is recognized as having a number of disadvantages. Most economically, lease crude is used to fuel the boiler producing the steam. One disadvantage to using steam alone is that the gases used to heat the steam are vented directly to the atmosphere and prohibit the use of sulfur containing fuels to prevent atmospheric pollution without the use of extensive and costly stack gas scrubbing devices.

The second basic method is commonly called "single well injection", or "huff-and-puff". The source is thermal energy, usually steam, which is injected into the formation through a single injection well in a predetermined quantity. This injection raises the temperature and formation pressure of the underground formation, hopefully allowing production through the same well after the steam injection is terminated.

There are, of course, many modified versions of the above two processes. For examples of "single well injection" processes, see U.S. Pat. Nos. 3,292,702; 3,409,083; 3,500,931; 3,782,470, 3,948,323 and 3,993,135. U.S. Pat. Nos. 4,124,071; 4,127,171; 4,127,172 and 4,133,384 illustrate versions of "steam drives", where separate wells are used for injection and production.

Several recent inventions described in U.S. Pat. Nos. 3,948,323 and 3,993,135, and notably 4,118,925 have proved quite successful in recovering hitherto unavailable heavy viscous petroleum from underground reservoirs without causing attendant air pollution problems. The apparatus and methods described in these patents which teach the injection a mixture of combustion gases and steam, have proved amazingly successful in producing viscous petroleum from reservoirs heretofore unproductive. Despite the great increase in production of hitherto unavailable viscous petroleum through the use of the above apparatus and method, it was discovered that nitrous and sulfurous oxides generated during the creation of the combustion gases from sulfur-containing fuels substantially increased corrosion in the downstream piping and well bore, particularly during the warm-up period of the equipment and subterranean formation adjacent the well bore. The nitrous and sulfurous oxides combine with the water present from condensed steam to form nitric and sulfuric acids, which are quite corrosive to metals. It was further discovered that the addition of an acid-neutralizing agent, such as, ammonia, to the thermal vapor stream generated in the practice of U.S. Pat. No. 4,118,925 controlled the corrosion problem. As is so often the case, one change in a dynamic system causes another, sometimes detrimental, result. It was discovered that the use of neutralizing agents control corrosion resulted in increased scale formation in the well production piping during the crude oil production phase of the cycle.

Scaling in the well production piping and valves decreases the efficiency of recovery and large scale build-ups eventually require cleaning, resulting in substantial downtime and loss of production. This problem is solved by the present invention which provides a method for the recovery of heavy viscous hydrocarbons from underground formations without large scale build-ups to impair the functioning of the equipment. Such an invention provides a process for injecting a thermal vapor stream into a viscous petroleum-bearing formation and permit the recovery of heavy viscous crudes from such formations efficiently and economically while still avoiding corrosion problems.

Using a sulfur-containing fuel, such as crude oil produced from the well provides a relatively inexpensive source of fuel. Other advantages of the present invention will become readily apparent to those having ordinary skill in the art from the specification.

SUMMARY OF THE INVENTION

The solution to the scaling problem is accomplished by injecting acidic compounds, particularly sulfurous oxides and/or nitrous oxides, simultaneously with a thermal vapor stream composed of a mixture of combustion gases and steam into a subterranean formation bearing heavy viscous crude oil. After condensation in the subterranean formation the acidic compounds in the thermal vapor stream lowers the pH level of the subterranean connate water, which, in turn, increases the solubility of metal ions in the connate water. Scaling of the oil production equipment appears to be directly related to the solubility of these ions in the connate water.

An acid-neutralizing agent, such as ammonia, is added to the thermal vapor stream in sufficient quantity to neutralize the nitrous and sulfurous oxides present in the thermal vapor stream during the beginning of the injection process while the equipment is at a low temperature causing the temperature of the thermal vapor to be reduced below the dew point of the contained water. It is necessary to add the acid-neutralizing agent during the start-up of the injection process to control corrosion in the downstream facilities. Once the downstream piping well bore and formation adjacent the well bore is heated to a temperature above the dew point of the thermal vapor gas stream, the addition of the acid-neutralizing agent can be reduced or stopped.

Once the temperature of the thermal vapor stream is above the dew point, the presence of the nitrous and sulfurous oxides in the steam is not unduly corrosive to the downstream piping. The steam in the thermal vapor stream which contains these acids condenses in the oil producing formation. This in turn, increases the solubility of the metal ions in the connate water. These metals are generally deposited as scale on the valves in the downhole pump, tubing, and the like, but because of the method of this invention any such deposition is reduced and causes no problem with the production of the viscous oils.

DETAILED DESCRIPTION OF THE INVENTION

It should be understood that the present invention may be employed for the recovery of substantially any type of viscous mineral from subterranean formations, particularly highly viscous petroleum, without the normally associated scale build-up in downstream and production piping and equipment. High scale build-up is normally an inherent disadvantage to the production of crude oil. The sources of such scaling are usually the ions of alkali earth metals which reside in the underground formation as solids and in a solution with the connate water of the formation. These alkali earth metal ions, predominately calcium and magnesium, tend to precipitate in the downstream piping, pumps and well bore tubing during production of viscous petroleum. The precipitates substantially hinder production rates, necessitating frequent, periodic cleaning of downstream equipment and associated production downtime.

The discovery of the present invention offers a tremendous range of control over scaling in downstream equipment by raising acidic content of the thermal vapor stream which is injected into the formation. It has been discovered that the acidity of subterranean connate water can be adjusted in order to vary the solubility for alkali earth metal ions, particularly calcium and magnesium. Connate water with a higher solubility for calcium and magnesium will transport these ions to the surface during production of the viscous petroleum crude oil instead of depositing them on the downstream equipment in the form of scale.

The instant invention provides four means of control over the solubility of such metal ions in the connate water. The first, and preferred, means of control occurs in the selection of the hydrocarbon fuel used to produce the combustion gases. A source of fuel with high nitrogen and/or sulfur content will naturally produce greater amounts of nitrous and sulfurous oxides during combustion, which will subsequently produce nitrous and sulfurous acids when condensed in the underground formation. The production, and injection, of acidic compounds into the formation in conjunction with the thermal vapor stream serves to maintain the scale-forming ions in solution. The ability to use hydrocarbon fuel high in sulfur and nitrogen content, such as, "sour crude", offers the exceptional advantage of being able to use the cheapest and most readily available hydrocarbon fuel in the world. Indeed, the utilization of fuel high in nitrogen and sulfur content is desirable to practice the instant invention. Previously the use of such fuels was studiously avoided because of environmental hazards. The practice of this invention is not so handicapped since the combustion gases are injected into the ground, and the otherwise unwanted compound is desired and put to good use in accordance with this invention. The only problem that may be associated with the use of a fuel, such as, "sour crude", is that it may be necessary to employ ammonia to prevent excessive acidity in the practice of the invention should the sulfur content be too high. The upper limit of the amount of acidic compounds injected is not known but can be determined on a case by case basis by observing the effects on equipment or testing the crude petroleum produced for its acid content. If corrosion is occurring then ammonia needs to be added. However, even with this level of uncertainty there is no comparison between the cost of ammonia and the amount of savings gained in fuel costs by using "sour crude". Even small amounts of acidic compounds have the effect of reducing scale formation.

As the second means of control, the quantity of water injected into the combustion chamber during combustion of the hydrocarbon fuel provides another means of control over the amount of acid injected with vapor stream and, consequently, the pH of the connate water. Water injected into the chamber during combustion lowers the combustion temperature and, thus, lowers the quantity of nitrogen oxides produced. A lesser amount of nitrous oxides produced results in smaller quantities of acid being injected into the subterranean formation. Consequently, the pH of the connate water will not be reduced as much. When the present invention is practiced using the apparatus disclosed in U.S. Pat. No. 4,118,925 and 227 liters of petroleum fuel are burned per hour, the injection of 0.2 liters of water per liter of fuel burned into the combustion chamber lowers the temperature of the combustion gases to 2066° C. If four liters of water per liter of fuel are injected into the combustion chamber, the temperature drops to 1371° C. At an injection rate of twelve liters of water per liter of fuel burned, the temperature further drops to 593° C. The preferred range of combustion temperature varies from about 590° C. to about 2200° C.

Third, the pH acid content of the connate water can be additionally controlled by varying the amount of acid-neutralizing agent added to the thermal vapor stream before injection into the ground. It has been found that the addition of ammonia substantially neutralizes the acidic components of the thermal vapor stream. Ammonia can be added during the formation of the thermal vapor stream to render it substantially non-corrosive during the start-up of the injection process when water is condensed in downstream piping and well tubing. After the downstream piping is heated to a temperature above the dew point of the thermal vapor stream, the addition of ammonia is substantially reduced, since corrosion of the downstream piping is no longer a serious problem due the amount of superheat in the thermal vapor, allowing some, or all, of the acidic compounds in the thermal vapor stream to pass into the connate water where they are condensed. Again, the amount of acidic compounds injected into the formation must be determined experimentally because of the wide range of characteristics found in the formation. This determination is well within the skill of those in the art upon reading this specification.

A fourth means of controlling the pH acid content of the connate water lies in the addition of acidic compounds to the thermal vapor stream if not provided by the fuel being burned. Nitrous and sulfurous oxides or the corresponding acids are preferred. Indeed, if clean-burning hydrocarbon fuels are used, the addition of such acidic compounds is necessary to practice the invention. The amounts must be experimentally determined by routine analyses and computation.

The instant invention has been developed in conjunction with the practice of U.S. Pat. No. 4,118,925, the disclosure of which is incorporated herein by reference, an apparatus and method for producing combustion gases to form the thermal vapor stream used to stimulate recovery of heavy viscous hydrocarbons. In a preferred embodiment, a fuel, preferably containing up to about 5% by weight sulfur and up to about 2% by weight nitrogen, is burned with a substantially stoichiometric amount of air in a pressurized combustion chamber to achieve substantially complete combustion of the fuel, in presence of sufficient water injected into the combustion chamber to maintain temperatures of from about 590° C. to about 2200° C. to form a combustion gas.

However, the instant method of controlling scale through the control of the pH level of the subterranean connate water is not limited to practice with the above-mentioned apparatus and method of U.S. Pat. No. 4,118,925. The instant process of controlling scale build-up during production of heavy viscous petroleum can be utilized with practically any method of steam or fluid injection to increase or stimulate recovery of viscous hydrocarbons. Indeed, such a process even finds great utility in the production of nonviscous hydrocarbons by injection methods from reservoirs whose natural pressure has been depleted because of production or reservoirs with a low or negligible natural pressure.

When practiced with an apparatus similar to that described in U.S. Pat. No. 4,118,925, the instant invention allows the recovery of hitherto unavailable heavy viscous petroleum from underground reservoirs without the build-up of substantial amounts of scale in the downstream piping, pump and well bore. Under normal operation, a small quantity of water is injected into the combustion chamber to reduce the quantity of nitrous oxides formed during the formation of a combustion gas. The amount of water injected depends upon the nitrogen content of the fuel, the desired quantity of ammonia to be added and the pH and desired pH levels of the underground connate water.

The combustion gases are contacted with water to produce the thermal vapor stream and ammonia is then added to the thermal vapor stream to raise the pH of condensed liquids above the corrosion causing level, usually in a range of from about 6.5 to about 7.5. This prevents severe corrosion of downstream facilities during start-up. During heating of the facilities, a portion of the thermal vapor stream may be vented from the well to maintain a gas velocity in the well to lift condensed liquid from the well. This procedure is continued until the piping, well bore and subterranean formation adjacent the well bore is heated before the dew point of the thermal vapor stream. This procedure is described in U.S. Pat. No. 3,993,135, for example, the disclosure of which is incorporated herein by reference. Once the thermal vapor stream has heated the downstream piping and well bore to a temperature above the dew point of the thermal vapor stream the corrosion problems caused by condensing acids in the thermal vapor stream are no longer serious and the venting of the well is ceased. The steam in the thermal vapor stream and the acidic compounds contained within then condense within the subterranean oil producing formation away from the well bore to help stimulate production of the oil.

At this point, the addition of ammonia is substantially reduced if not stopped altogether, to allow the thermal vapor stream to become acidic. This will allow the acidic compounds to be injected into the formation and substantially lower the pH of the connate water which comes in contact with the thermal vapor stream, which, in turn, increases the solubility of the connate water for the alkali earth metal ions present in the subterranean formation. This increase in solubility significantly decreases the deposition of metal ions in the form of scale.

The present invention can be readily practiced with practically any method of steam or fluid injection to increase hydrocarbon production. A combination of the present method of controlling the pH of the subterranean connate water with the method disclosed in U.S. Pat. No. 3,993,135, and incorporated herein by reference, is particularly effective in producing heavy viscous petroleum without substantial scaling. The same production benefits can be obtained without substantial scaling and with little or no corrosion in the downstream piping, pump and well bore, by combining the instant invention with the simultaneous venting of the thermal vapor stream at the surface at a rate and pressure to maintain a gas velocity in the well bore sufficiently high to lift any condensed liquids forming in the well bore towards the surface. Again, as with the addition of ammonia to the thermal vapor stream, the simultaneous venting of the vapor stream at the surface is no longer needed after sufficient heat has been imparted to the formation to prevent condensed liquids from forming and collecting in the well bore.

The same advantages of producing heavy viscous petroleum with little or no subsequent scale build-up in the downstream equipment can be achieved by jointly employing the present invention with the method of U.S. Pat. No. 3,948,323. The injections of the thermal vapor stream containing acidic compounds are alternated with injections of a heated non-condensable gas.

The control of scale build-up through the practice of the present invention additionally achieves several other advantages. It has been found that the permeability of the formation is significantly increased around the well bore where calcium and magnesium salts tend to congregate, restricting production flow. This increase in permeability allows for an increased production flow after heating, thus reducing the overall cost of recovery of the crude oil. Higher injection rates and much greater production rates from subterranean formations containing viscous petroleum are achievable. Additionally, the injection of the low pH thermal vapor stream, which contains carbon dioxide as a combustion gas, substantially improves the injectivity of the thermal vapor stream into heavy oil-bearing limestone formations. Thus, the overall volume of viscous petroleum that each injection and production well is able to produce is significantly increased.

The method of this invention has proved to be especially effective in controlling scale build-up in the production of viscous crude in a test field in southeastern Kansas. Comparison testing was conducted on two adjacent wells in the same formation. One well was injected with the thermal vapor stream containing ammonia during the entire injection process. The addition of ammonia was not discontinued. During the subsequent oil production phase, it was necessary to pull the down hole pump every seven to fourteen days due to scaling on the parts. A second well, a mere three hundred sixty-one feet from the first well was also injected with the thermal vapor stream. In this well stimulation the addition of ammonia was discontinued after the warming step. During subsequent production, no scaling of the down hole and production equipment was evidenced. Additionally, fluid production was found to have significantly increased.

It should be understood that the foregoing disclosure and description of the invention are illustrative and explanatory thereof, and various modifications may be made in the process without departing from the spirit of the invention. The instant process, which allows for the stimulated production of viscous petroleum without the normally concurrent scale build-up in downstream and production equipment, can be employed with practically other thermal injection process known in the art.

I claim:

1. A method of producing heavy viscous petroleum crude oil from a subterranean formation which comprises the steps of:
   a burning a sulfur containing fuel with a substantially stoichiometric amount of air in a pressurized combustion chamber to achieve substantially complete combustion of the fuel, in the presence of sufficient injected water to maintain temperatures of from about 590° C. to about 2200° C., to form a combustion gas;
   injecting water and ammonia into the combustion gas to produce a thermal vapor stream;
   warming downstream piping and a well bore communicating with a subterranean deposit of heavy viscous petroleum crude oil, venting a portion of the vapor stream from the well to maintain gas velocity in the well to lift condensed liquids from the well, for a time sufficient to warm the piping, well bore and the subterranean formation adjacent the well bore;
   ceasing the venting from the well and reducing the injection of ammonia into the combustion gases and water into the combustion chamber to allow acidic compounds, formed in the pressurized combustion chamber, to be injected into the subterranean formation through the well bore with the vapor stream whereby the acidic compounds in the vapor stream increase the acidity of the connate water in the formation;
   discontinuing the injection of the thermal vapor stream when the formation and oil is heated; and
   recovering the petroleum crude oil from the well bore.

* * * * *